United States Patent [19]
Schinke et al.

[11] 3,717,562
[45] Feb. 20, 1973

[54] FERROELASTIC $TB_2(MOO_4)_3$ AND DEVICES INCORPORATING

[75] Inventors: David Paul Schinke, Berkeley Heights; Le Grand Gerard Van Uitert, Morris Township, Morris County, both of N.J.

[73] Assignee: Bell Telephone Laboratories, Incorporated, Murray Hill, N.J.

[22] Filed: July 15, 1970

[21] Appl. No.: 54,996

[52] U.S. Cl. ......................204/180 R, 310/8, 310/9.5
[51] Int. Cl. ..........................B01d 13/02, B01k 5/00
[58] Field of Search ........204/180 R, 130; 310/9.5, 8; 317/258; 252/62.9

[56] References Cited

UNITED STATES PATENTS

| | | | |
|---|---|---|---|
| 1,997,263 | 4/1935 | Meissner | 204/31 |
| 2,897,126 | 7/1959 | George | 204/130 |
| 3,134,730 | 5/1964 | Haven et al. | 204/130 |
| 3,365,400 | 1/1968 | Pulvari | 252/62.9 |
| 3,375,420 | 3/1968 | Sher et al. | 317/258 |
| 3,405,440 | 10/1968 | Nolta et al. | 252/62.9 X |
| 3,437,432 | 4/1969 | Borchardt | 252/62.9 X |
| 3,437,597 | 4/1969 | Belloc | 252/62.9 |
| 3,472,776 | 10/1969 | Derbyshire | 252/62.9 |
| 3,535,602 | 10/1970 | Hrach et al. | 317/258 |

OTHER PUBLICATIONS

Hampel, "Encycl. of Electro Chem.," Reinhold Publish. Corp., (1964), QD 553 E5C.2

*Primary Examiner*—John H. Mack
*Assistant Examiner*—A. C. Prescott
*Attorney*—R. J. Guenther and Edwin B. Cave

[57] ABSTRACT

High temperature electric field treatment of $Tb_2(MoO_4)_3$ in the presence of hydrogen or deuterium results in a significant decrease in the drive voltage required to switch crystals ferroelastically.

14 Claims, 4 Drawing Figures

PATENTED FEB 20 1973 3,717,562

INVENTORS D. P. SCHINKE
L.G. VAN UITERT
BY George S. Indig
ATTORNEY

FERROELASTIC $TB_2(MOO_4)_3$ AND DEVICES INCORPORATING

BACKGROUND OF THE INVENTION

1. Field of the Invention

The invention is concerned with ferroelastic material and devices based on this property. Such devices, usually digital, may operate as switches and memories. Readout may be accomplished, inter alia, by use of polarized light, non-sinusoidal electrical signals, or by temperature change due to pyroelectric response.

2. Description of the Prior Art

Recent literature references have evidenced some interest in devices constructed of gadolinium molybdate $Gd_2(MoO_4)_3$, see for example Vol. 27, Journal of Physical Society of Japan, p.511 (1969). This interest is based on the observed ferroelastic properties of this composition in accordance with which normal ferroelectric switching is accompanied by a crystallographic interpositioning of crystallographic directions.

Observation of ferroelasticity immediately gave rise to a number of devices which depend on the crystallographic "pinning" of ferroelectric domains. Such devices, which are usually digital in operation, have a "memory," stability of which is at least partly due to the crystallographic interpositioning. Some workers believe that ferroelastic materials may replace normal ferroelectric materials in a diversity of prior art devices.

Relevant devices utilize applied electric fields to switch polarization direction and readout may depend on any of several characteristics attendant upon polarization reversal. Readout techniques include sensing of the charge developed through the pyroelectric effect, response to a non-sinusoidal pulsed field, and dependence on the change in transmission for a plane polarized light beam due to birefringence change.

Development of such devices is still at a fairly early stage and whether they will be competitive with devices operating on other principles will depend on a variety of parameters including drive voltage, birefringence magnitude, etc.

SUMMARY OF THE INVENTION

The isomorphous orthorhombic crystal of terbium molybdate, $Tb_2(MoO_4)_3$, as treated in accordance with the invention, is found to evidence lower drive voltages for switching polarization than those required for $Gd_2(MoO_4)_3$. Treatment entails hydrogen or deuterium diffusion at high temperature with the crystal under the influence of an electric field. Similar treatment of $Gd_2(MoO_4)_3$ is not generally useful in that crystalline imperfections are introduced due to a crystallographic transition below the treatment temperature. However, mixed crystals of $Tb_2(MoO_4)_3$ containing $Gd_2(MoO_4)_3$, as well as certain other modifications, are usefully treated.

In general, treatment involves diffusion of hydrogen or deuterium during the passage of a net uniaxial current through the crystal under the influence of an electric field of from 50 volts per centimeter to 50,000 volts per centimeter and a temperature of at least 300°C for times of the order of at least one-half hour per centimeter (in the field direction). Requisite diffusion can be realized by employing an ordinary air ambient or hydrogen or deuterium. Either element may be supplied as the elementary gas or a compound such as the oxide, ammonia or other molecules that contain the requisite element/s and will release them under the conditions of treatment.

Resultant drive voltages for treated $Tb_2(MoO_4)_3$ are reduced to values significantly less than those for $Gd_2(MoO_4)_3$. An additional advantage in the use of $Tb_2(MoO_4)_3$ for optical readout devices results from the inherently larger birefringence.

DETAILED DESCRIPTION

1. The Figures

Figure 1:
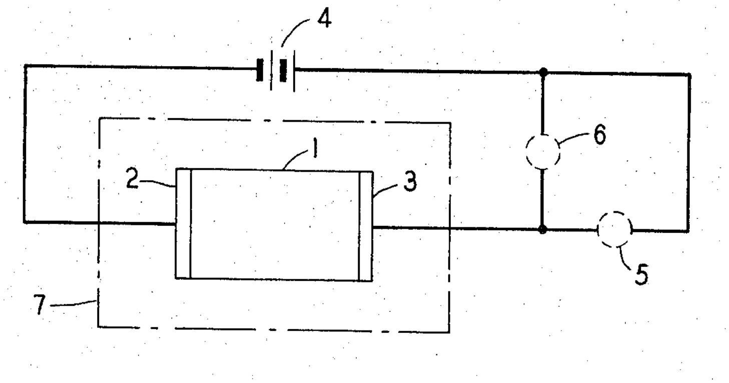
FIG. 1 is a schematic representation of a $Tb_2(MoO_4)_3$ crystal undergoing processing in accordance with the invention.

FIG. 1 is illustrative of apparatus suitable for processing crystalline material in accordance with the invention. $Tb_2(MoO_4)_3$ crystalline body 1 (usually a single crystal) is provided with electrodes 2 and 3 by means of which the body is made part of a series circuit including d.c. source 4 and optionally ammeter 5 and voltmeter 6. The temperature of crystal 1 is maintained at the required level by means of furnace 7. As indicated, a normal air atmosphere is a suitable ambient for introduction of hydrogen. Accordingly, no special provision is shown in the figure for atmospheric control. In the event that such atmospheric control is desired, suitable ambient may be introduced directly into furnace 7.

Figure 2:
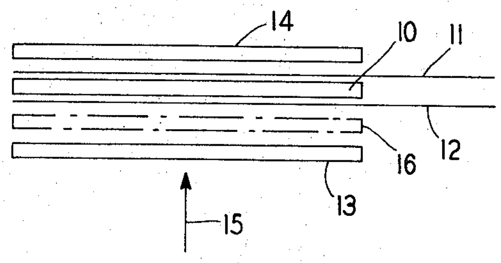
FIG. 2 is an elevational view of a digital light valve utilizing a $Tb_2(MoO_4)_3$ crystal treated in accordance with the invention.

The apparatus of FIG. 2 is shown as a simple light valve and is illustrative of devices utilizing electromagnetic wave readout. In this apparatus, ferroelastic body 10 of $Tb_2(MoO_4)_3$ is provided with face electrodes 11 and 12 connected to means not shown. Such means is suitable for imposing a sufficient electrical field to reverse the polarization of body 10. Electrodes 11 and 12 are transparent to the electromagnetic radiation used for readout and may, for example, be constructed of tin oxide, $SnO_2$. The major faces of body 10, those in contact with face electrodes 11 and 12 define crystallographic C planes so that the direction orthogonal to these faces defines a C direction. The A and B crystallographic directions of this orthorhombic crystal, therefore, lie in the plane of the body. Elements 13 and 14 are made of polarizing material and act as polarizer and analyzer, respectively, with respect to incoming beam 15. Retardation plate 16, shown in phantom, is optionally included to adjust the apparatus so as to provide for maximum transmission for one or the other of the two states of element 11. As discussed further on, optical readout depends upon the interpositioning of the crystallographic A and B axes. Such interpositioning produces a shift in birefringence. For one type of operation, in accordance with this arrangement, beam 15 is plane polarized, for example, by element 13 so that its electrical vector lies at an angle of 45° to both of the crystallographic A and B axes of element 10. Polarization reversal changes the magnitude of E vector parallel to the polarization direction of element 14 and, therefore, changes the amplitude of a transmitted beam.

Figure 3:
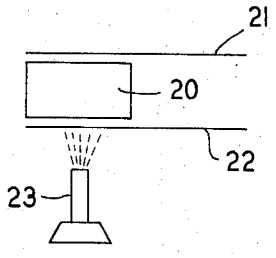
FIG. 3 is a front elevational view of a ferroelastic device utilizing a crystal prepared in accordance with the invention and depending upon readout due to pyroelectric response.

The apparatus of FIG. 3 consists of ferroelastic element 20, again, constructed of $Tb_2(MoO_4)_3$ treated in accordance with the invention and, again, provided with electrodes 21 and 22. Such electrodes are connected to suitable means, not shown, for both producing the ferroelectric polarization reversal required and for sensing the momentary EMF resulting from the thermal change produced by heating source 23. Readout is dependent on a pyroelectric mechanism.

Figure 4:
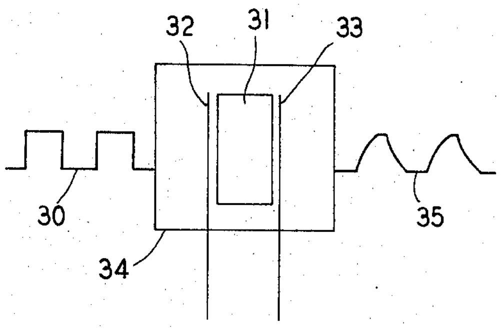
FIG. 4 is a front elevational view of such a device depending upon electric readout.

The apparatus of FIG. 4 depends upon electrical readout utilizing a nonsinusoidal pulse or pulse train. Polarization sensing is dependent upon capacitive charging. A positive unidirectional or biased pulse traveling in a minus-to-pulse dipole direction is undistorted by charging while reversal of either parameter pulse, polarity, or ferroelectric polarization results in initial pulse distortion due to extraction of the energy required to charge the "capacitor." In the figure, a biased wave, schematically depicted as square pulse wave train 30, is introduced into ferroelastic body 31, again, constructed of a material in accordance with the invention. Body 31 is provided with face electrodes 32 and 33 which are, in turn, connected with biasing source not shown for switching the polarization of body 31. In the arrangement shown, body 31 is contained within a resonant cavity 34. The form of emerging wave 35 is such as indicates the polarization state of body 31. The pulse form for wave 35 indicated on the figure may result when the ferroelectric polarization of body 31 is in the high impedance direction with respect to incoming wave 30, e.g., for a positive pulsed wave 30, the ferroelectric polarization is plus-minus in the propagation direction. This pulse form is merely illustrative of a form of distortion which may take place due to the usual capacitive charging mechanism. With the ferroelectric polarization in the "easy" direction relative to the incoming wave, the pulse is substantially undistorted by any such charging mechanism and shows only the distortion, generally symmetrical, due to frequency nonlinearity.

2. Processing

The mechanism, resulting in improvement of ferroelastic properties, in accordance with the invention, is not completely understood. It has been experimentally established, however, that the responsible mechanism is diffusion dependent. In the event that the applied electric field or the time or the temperature is inadequate to produce through diffusion, the threshold value required for ferroelectric switching is nonuniform. The following parameter ranges have been experimentally determined to be sufficient for either hydrogen or deuterium diffusion resulting in the described advance.

While one of the parameters considered is time, process completion may be directly observed by monitoring current flow with a given applied voltage, completion being indicated by attainment of a stable (lowered) value.

Inhomogeneous field gradients result in inhomogeneous diffusion and, consequently, may result in nonuniform ferroelectric polarization threshold. Processing is desirably carried out in such manner as to minimize such field gradients during field treatment. Electrodes are desirably low resistance and desirably extend over the entirety of flat parallel opposing faces on a crystalline body of uniform cross section from electrode to electrode. Suitable electrodes have been prepared by use of commercial platinum paste which is painted on and dried so as to remove the temporary binder. Any other technique resulting in a contact resistance of 20,000 ohms per square centimeter or below is suitable providing the resulting contact is suitably temperature stable.

Ferroelectric poling where desired entails imposition of a field at least instantaneously at a temperature somewhat below the Curie temperature (157°C). In poling it is required that the field direction include at least a component of the crystallographic C axis. It should be understood that poling is a separate and distinct process and that the inventive treatment may be effectively carried out without regard to crystalline direction.

It has been found that a minimum temperature of 300°C is adequate for the described process. Temperatures substantially below this minimum may require use of voltage gradients in excess of the breakdown potential of the crystal so that arcing may result. Generally, use of higher temperatures, up to about 700°C is expedient, in that it permits use of smaller applied fields. While still higher temperatures may be utilized and may permit use of still smaller field gradients, apparatus limitations generally dictate use of temperatures of 700°C or lower. Further, it has been observed that there is a reaction at the negative electrode which is accelerated at higher temperature, this observed reaction again suggesting a preference for a maximum temperature of the order of 700°C. To prevent strain and possible breakage, it is desirable to bring the specimen to temperature slowly. A heating rate of about 100°C per hour was used in an example herein without deleterious result. Limitations on this parameter, of course, depend on crystal size and strain sensitivity in the ultimate device use.

The passage of current through the body of $Tb_2(MoO_4)_3$ is commenced before, during, or after attainment of temperature. The range of voltage gradients considered adequate for these processes is from a minimum of 50 volts per centimeter to a maximum of 2,000 volts per centimeter, with the smaller value corresponding with the higher temperature value indicated above. Neither, however, represents an absolute limit. Use of values below the minimum merely requires greater treatment time. Values significantly in excess of the indicated maximum may result in arcing but, under certain circumstances and with special care, such value may be exceeded, with concomitant decrease in processing time. Generally, a preferred treatment range is from 250 volts per centimeter to 1,000 volts per centimeter. The preferred minimum is chosen on the basis of treatment time; the preferred maximum merely provides for an increased safety margin below breakdown.

It has been established that the inventive procedures involve diffusion of hydrogen from one electrode to the other. The progress of this diffusant may be traced in either of two ways. It may be determined in the form of an interference fringe which moves from electrode to electrode with the region of innermost hydrogen penetration. The diffusion of hydrogen and its collection at dislocation sites results, too, in an increase in resistivity, which, for constant applied voltage manifests itself during processing in the form of a decreasing current. This current reaches a constant value when through-penetration has been achieved. This may be monitored manually or automatically.

As would be expected, treatment time is dependent upon the length of specimen between electrodes. It has been indicated that time is dependent on applied voltage, with required time decreasing as voltage increases. Under typical conditions within the preferred voltage range, indicated treatment times of the order of one-half hour per centimeter are necessary. Treatment time of the order of five hours per centimeter is, however, required at the broad minimum limit of 50 volts per centimeter.

Cooling is, of course, carried out at a rate sufficiently slow to prevent introduction of strain, which may be harmful, depending upon sectional size and desired application. Again, for a cube-shaped crystal of the order of a centimeter on a side, a cooling rate of the order of 100°C per hour was found suitable.

For most uses, the diffusion process is carried out in air, as has been noted. Use of ambients yielding larger contribution of hydrogen have been found desirable under certain circumstances, for example, to accelerate diffusion. Use of deuterium may be preferred to hydrogen for optical readout purposes despite its expense for the reason that the O—D bond does not absorb near the 1.06 micron region vital for YAG:Nd laser operation.

3. Composition

The invention is generally described in terms of $Tb_2(MoO_4)_3$. While the procedure is, in principle, applicable to the related material $Gd_2(MoO_4)_3$, it has been experimentally determined that expedient processing conditions, particularly with long-term exposure to a high temperature, results in perceptible crystal damage. In single crystals, the treatment produces a milky appearance indicating light scattering. Such crystals would, therefore, not be suitable for optical readout devices. Nevertheless, such treatment does result in a reduction of drive voltage, and treated $Gd_2(MoO_4)_3$, even though milky in appearance, may be advantageous to untreated material in devices depending upon other than optical readout. Since the two materials are isomorphous, it is possible to form mixed crystals, and such compositions too are susceptible to treatment in accordance with the invention. Other compositional variations include Sm to increase spontaneous polarization and Dy to increase birefringence. Such substitutions which may exceed 10 percent, depending on ion size, may be made for the purpose of increased readout signal, increased contrast and reduced switching voltage.

In general, it is desirable to utilize materials of a purity of at least 99.9 percent. Unintentional impurities, particularly Ba, Cs and Th or other monovalent, divalent, tetravalent and pentavalent metals result in a measurable increase in ferroelectric reversal threshold voltage and are, therefore, undesirable.

4. Example

The general processing parameters have been described. A particular example is presented to illustrate the device advantages which may be realized. Parameters of concern are signal-to-noise ratio (extinction coefficient in the instance of optical readout) and switching voltage. For optical readout, the greatest visual contrast between the two states of the material is obtained when the thickness of the material is such that switching produces a phase retardation of $\pi$ radians. For $Tb_2(MoO_4)_3$, the corresponding thickness is 0.067 centimeter. Since, however, required switching voltage decreases for thinner sections, optimum device design may represent a compromise between these two considerations. The sample treated in this example was of the order of 0.5 centimeter by 0.5 centimeter by 0.033 centimeter.

Prior to treatment, the ferroelastic switching voltage of the section was measured and found to be approximately 182 volts. This is equivalent to about 5.5 kV/centimeter. The apparatus utilized depended upon optical readout and was generally similar to that of FIG. 2.

The crystalline section was treated in air and a temperature of 700°C for a period of about 3 hours with a field of 2,000 volts per centimeter applied across electrodes of pt-paste across the broad faces of the section.

Following this treatment, the section was, again, tested on the same apparatus on which it was tested before treatment, and it was observed that the switching field had been reduced to a value of approximately 60 volts corresponding with a field of approximately 1.8 kV/m.

What is claimed is:

1. Process of treating a crystalline body of ferroelastic material comprising passing direct current through said material under influence of an applied electric field, characterized in that said material comprises the nominal composition $Tb_2(MoO_4)_3$, in that the said material is maintained at an elevated temperature of at least 300°C, in that the ambient atmosphere is of such composition as to yield an element selected from the group consisting of hydrogen and deuterium to the said material, and in that the said process is continued for a period sufficient to cause diffusion of said element substantially through the said material in the direction of the said applied electric field.

2. Process of claim 1 in which the said crystalline material is a single crystal consisting essentially of the said composition.

3. Process of claim 1 in which the applied field is of a potential of at least 50 volts per centimeter of crystal length in the direction of the applied field.

4. Process of claim 3 in which the said potential is at least 250 volts per centimeter on the same basis.

5. Crystalline material produced in accordance with claim 1.

6. Element comprising the crystalline material of claim 5 together with means for producing a current flow through the said material in a direction approximately corresponding with the crystallographic C direction.

7. Device comprising a crystalline body of ferroelastic material provided with first means for reversing the ferroelectric polarization of at least a portion of said body and second means for detecting the polarization direction of the said portion, characterized in that said crystalline body comprises the nominal composition, $Tb_2(MoO_4)_3$, prepared by a treatment including maintaining said material at a temperature of at least 300°C in an atmosphere of such composition as to yield an element selected from the group consisting of hydrogen and deuterium while causing passage of current through said material under the influence of an applied electric field, the said treatment being continued for a period sufficient to cause diffusion of the said element substantially through the said material in the direction of the said applied electric field.

8. Device of claim 7 in which said crystalline body is a single crystal consisting essentially of the said composition.

9. Device of claim 8 in which the said applied field is in a direction approximately corresponding with the crystallographic C direction of the crystal.

10. Device of claim 7 in which the said applied field has a potential of at least 50 volts per centimeter of the said body in the direction of the said applied field.

11. Device of claim 7 in which the said second means includes provision for the introduction and extraction of polarized electromagnetic radiation.

12. Device of claim 11 in which the provision for extraction includes a plane polarization analyzer.

13. Device of claim 7 in which the said second means is adapted for sensing the polarity of a voltage developed through a pyroelectric interaction.

14. Device of claim 7 in which said second means includes provision for introducing pulsed electrical energy together with provision for detecting any pulse distortion produced by capacitive charging of ferroelectric domains polarized in the reverse direction relative to the said pulsed electrical energy.

* * * * *